No. 873,062.

PATENTED DEC. 10, 1907.

A. LUCHINGER.
MOTOR SLEIGH.
APPLICATION FILED AUG. 10, 1907.

Witnesses:
Arthur E. Gumpe
Adolph Minel

Inventor
Albert Luchinger
By his Attorney

UNITED STATES PATENT OFFICE.

ALBERT LUCHINGER, OF NEW YORK, N. Y.

MOTOR-SLEIGH.

No. 873,062.　　　　Specification of Letters Patent.　　　Patented Dec. 10, 1907.

Application filed August 10, 1907. Serial No. 387,963.

*To all whom it may concern:*

Be it known that I, ALBERT LUCHINGER, a citizen of Switzerland, residing at the city of New York, borough of Bronx, county and State of New York, have invented a new and Improved Motor-Sleigh, of which the following is a specification.

This invention relates to an improved motor sleigh, which is propelled by means of a pair of driving wheels arranged between the runners and adapted to find a bearing on the snow. The construction is such that the wheels can be sunk into the snow to different depths, and that they will automatically adjust themselves to drifts extending in a direction longitudinal to the road.

Figure 1:
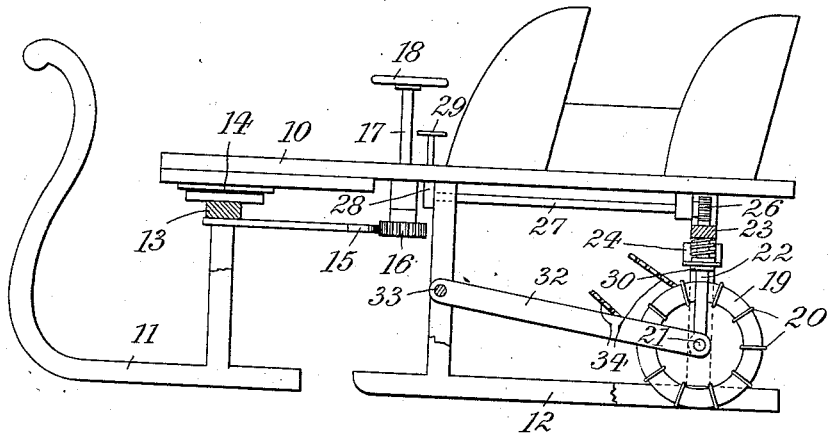
Figure 2:
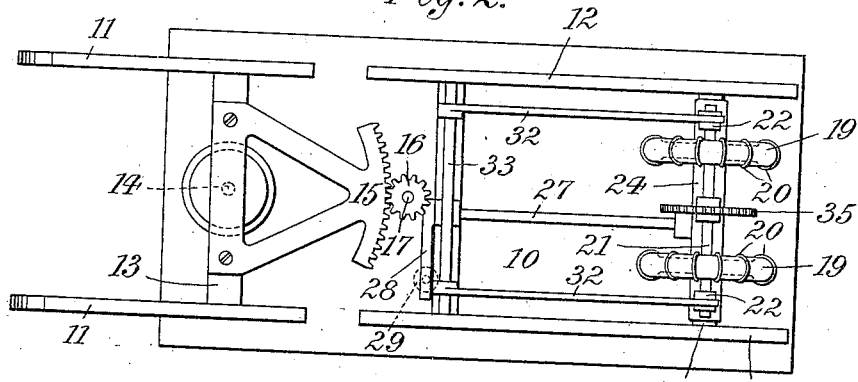
Figure 3:
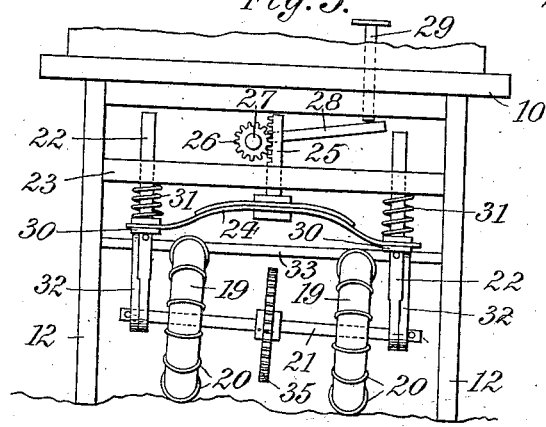

In the accompanying drawing: Figure 1 is a side view partly in section of my improved motor sleigh, Fig. 2 a bottom view, and Fig. 3 a rear view thereof.

The body 10 of the sleigh is provided with front runners 11 and rear runners 12. The front runners are connected by a cross piece 13 turning on bolt 14 and provided with a toothed segment 15. This segment is engaged by a pinion 16 fast on a spindle 17 of the steering wheel 18. By the means described the forward runners 11 may be turned in either direction to steer the vehicle.

Between the rear runners 12 are arranged a pair of propelling wheels 19 each provided with snow creepers 20. Wheels 19 are mounted on a laterally tilting and vertically movable axle 21 journaled in the lower ends of a pair of vertically movable rods 22. These rods pass near their upper ends through a perforated cross piece 23 of the sleigh in which they find a bearing. Rods 22 also pass through opposite ends of a leaf spring 24 connected at its center to a rack 25 guided in cross piece 23. This rack is en-
gaged by a pinion 26 fast on a rock shaft 27 that may be turned by treadle 29 through arm 28. The ends of spring 24 bear on collars 30 fast on rods 22, while between spring 24, and cross piece 23, rods 22 are encircled by auxiliary coiled springs 31.

In order to hold axle 21 against rearward displacement while the sleigh is in motion, it is hung in the rear ends of a pair of braces 32, the forward ends of which are pivoted to the sleigh at 33. The perforations in cross-piece 23 that accommodate rods 22, are of a size sufficient to permit the laterally tilting motion of axle 21, as well as its movement around center 33. Axle 21 is rotated from a suitable motor (not shown) by chain 34 and chain wheel 35.

In use, rotation of axle 21 will cause the propeller wheels 19 to grasp the snow with their creepers 20, so as to draw the vehicle forward. In case the snow is banked higher on one side of the road than on the other, axle 21 will tilt, (Fig. 3) so as to partly withdraw the buried wheel. The driver by means of treadle 29 can depress axle 21, to sink wheels 19 into the snow to any depth desired, and thus adjust the propellers to different grades and to different consistency of the snow.

I claim:

A motor sleigh provided with an axle, a pair of propelling wheels mounted thereon, a pair of vertically movable rods connected to the axle, a leaf spring connecting the rods, a rack mounted on the leaf spring, and a pinion engaging the rack, substantially as specified.

Signed by me at New York city, New York, this 9th day of August 1907.

ALBERT LUCHINGER.

Witnesses:
　FRANK V. BRIESEN,
　ARTHUR E. ZUMPE.